United States Patent [19]
Forster et al.

[11] Patent Number: 5,897,739
[45] Date of Patent: Apr. 27, 1999

[54] METHOD FOR MAKING HONEYCOMB CORE COMPOSITE ARTICLES

[75] Inventors: William V. Forster, Seymour; Kenneth M. Nowak, Easton; Larry J. Osiecki, Oxford, all of Conn.

[73] Assignee: Sikorsky Aircraft Corporation, Stratford, Conn.

[21] Appl. No.: 08/612,948

[22] PCT Filed: Jan. 27, 1995

[86] PCT No.: PCT/US95/01099

§ 371 Date: Jan. 27, 1995

§ 102(e) Date: Jan. 27, 1995

[87] PCT Pub. No.: WO96/22878

PCT Pub. Date: Aug. 1, 1996

[51] Int. Cl.$^6$ ............................................. B32B 31/00
[52] U.S. Cl. ........................ 156/285; 156/382; 156/292
[58] Field of Search ................................ 156/285, 382, 156/292

[56] References Cited

U.S. PATENT DOCUMENTS

| | | | |
|---|---|---|---|
| 3,912,542 | 10/1975 | Hirano et al. | 156/104 |
| 4,816,106 | 3/1989 | Turris et al. | 156/285 |
| 4,869,770 | 9/1989 | Christensen et al. | 156/286 |
| 4,942,013 | 7/1990 | Palmer et al. | 264/511 |
| 5,242,651 | 9/1993 | Brayden et al. | 264/510 |
| 5,261,993 | 11/1993 | Dahlgren | 156/382 |
| 5,281,388 | 1/1994 | Palmer et al. | 264/571 |

*Primary Examiner*—Francis J. Lorin
*Attorney, Agent, or Firm*—Brian A. Collins

[57] ABSTRACT

A method for making a honeycomb core composite article includes forming a honeycomb core (24) and a precured composite skin (20) having a core edge (32) and a restraint edge (30), respectively. The precured composite skin (20) is placed in combination with a rigid mold member having a mold surface (12s) and the honeycomb core (24) is mated with the precured composite skin (20) to form a mated subassembly (36). An uncured composite skin (22) is laid over the mated subassembly (36) such that a peripheral portion (44) of the uncured composite skin (22) extends beyond the restraint edge (30) by a distance X and such that the peripheral portion (44) is in superposed abutting engagement with the mold surface (12s). The honeycomb core (24), the precured composite skin (20) and the uncured composite skin (22) define a composite lay-up (10) over which a vacuum bag (14) is disposed. The resultant mold cavity (60) is evacuated to urge the vacuum bag (14) against the uncured composite skin (22) thereby effecting engagement of the peripheral portion (44) with the restraint edge (30) and the mold surface (12s). The composite lay-up (10) is then cured to form the completed honeycomb core composite article. The method produces a honeycomb core composite article wherein the honeycomb core (24) thereof is accurately located and substantially distortion-free.

13 Claims, 4 Drawing Sheets

METHOD FOR MAKING HONEYCOMB CORE COMPOSITE ARTICLES

TECHNICAL FIELD

The present invention relates to manufacturing honeycomb core composite articles, and more particularly, to an improved-method of manufacturing such composite articles wherein the honeycomb core thereof is accurately located and substantially distortion-free.

BACKGROUND OF THE INVENTION

Composite articles incorporating honeycomb cores are commonly utilized for fabricating aerospace structures due to their advantageous strength to weight ratio. Honeycomb core (HC) composite articles are typically comprised of upper and lower composite skins, i.e., fiber reinforced resin matrix laminates, that are separated and stabilized by the honeycomb core. Due to the high bending stiffness and compressive strength properties of HC composite articles, i.e., the honeycomb core functions as a shear web and spaces the composite skins from the bending neutral axis, HC composite articles have particular utility in aerospace applications such as aircraft fuselage panels and door structures. The high strength and low weight of such construction results in lower overall aircraft system weight.

HC composite articles may be fabricated utilizing various composite forming methods. The most commonly employed technique involves the use of a vacuum bag molding assembly wherein an impervious membrane or "vacuum bag" is employed for consolidating the composite skins and ensuring proper adhesion thereof to the centrally disposed honeycomb core. More specifically, the lower composite skin, honeycomb core, and upper composite skin are sequentially laid in a rigid mold member so that the honeycomb core is overlaid by the upper and lower composite skins. The upper and lower composite skins are formed from uncured "prepreg" or "B-stage" laminates comprised of a fiber reinforcement such as graphite, aramide or fiberglass fibers disposed in a binding matrix such as epoxy, phenolic or other similar organic resinous material. Film adhesive, which is applied to the honeycomb core prior to the lay-up, forms the bonds between the upper and lower composite laminates and the honeycomb core. The vacuum bag is disposed over the rigid mold member and sealed thereto so as to form a mold cavity which is occupied by the uncured composite lay-up. The mold cavity is then evacuated and additional pressure and temperature are applied via an autoclave oven to cure the lay-up. The combination of vacuum and external pressure functions to consolidate the composite skins, remove air and volatiles from the resin binder, and apply the necessary compaction pressure to ensure full and uniform adhesion of the lay-up.

Difficulties commonly encountered during the fabrication of HC composite articles relate to shifting and/or distortion of the honeycomb core under compaction pressure. While the honeycomb core is relatively stable in the direction of the individual cells, i.e., the cells provide significant buckling stability, it will be appreciated that pressure applied transversely of the cells may cause distortion and/or shifting, e.g., accordioning, of the honeycomb core due to the inadequate strength thereof in a lateral direction. This is more clearly understood by reference to FIG. 1a wherein a lay-up of upper and lower composite skins 100, 102, and a honeycomb core 104 is disposed in a vacuum bag molding assembly 108. The vacuum bag 110 is shown applying a lateral component of pressure P along the ramped edges of the honeycomb sore, which lateral pressure component causes the local collapse and distortion of the honeycomb core edges. FIG. 1b shows a top view of the cured HC composite article wherein the distortion, indicated by dashed lines 112, is exaggerated for illustrative purposes.

Attempts to overcome problems of distortion and shifting have included stabilization techniques wherein the edges of the honeycomb core, i.e., several rows of honeycomb cells about the entire periphery, are stabilized by the application of film adhesive or filled with a low density syntactic foam. Once cured, the film adhesive and/or the foamfilled cells serve to retard the accordioning of the honeycomb core. U.S. Pat. Nos. 4,680,216 and 5,354,195 discuss honeycomb core stabilization techniques and various materials useful therefor. While these techniques have been marginally successful in limiting distortion of the honeycomb core (on the order of about 0.64 cm to 0.95 cm (0.25 in to 0.375 in), such materials are substantially parasitic and are not practical for applications wherein minimization of overall aircraft weight is a critical design criterion. Furthermore, these stabilization options are not acceptable for applications wherein accurate and distortion-free core location is highly critical. For example, applications requiring the use of radar absorbent (i.e., carbon-loaded) honeycomb core to defeat enemy radar require far more exacting manufacturing tolerances than those which can be produced by prior art stabilization techniques. If shifting of the radar absorbent honeycomb core should occur during the manufacturing process, radar coverage on the aircraft could be compromised.

Other attempts to yield a distortion-free core have included the use of restraint devices formed or assembled about the periphery of the molding assembly. FIG. 2a depicts a vacuum bag molding assembly wherein rows of vertically protruding pins 120 are affixed to a rigid mold member 122 and disposed in adjacent relation to the HC composite article 124 to be formed. As the upper composite skin 126 is laid over the honeycomb core 128, the pins 120 are caused to engage a peripheral portion 130 of the upper composite skin 126, i.e., pierce the composite fabric, to prevent lateral displacement thereof during the molding/compaction process. A bridging effect is thereby created in the upper composite skin 126, i.e., between the uppermost corner 132 of the honeycomb core 128 and the mating surface 134 of the lower composite skin 136, to react lateral compaction pressure and, consequently, prevent distortion of the honeycomb core 128. While this technique is suitable for high tolerance applications, e.g., LO applications, the protruding pins 120 are a source of high maintenance, i.e., requiring periodic cleaning and repair, pose a hazard to the operator, and create difficulties when sealing the vacuum bag 138 to the rigid mold member 122. Regarding the latter, the vacuum bag 138 must be sealed outboard of the protruding pins 120, thus requiring the additional step of disposing a protective elastomer strip 139 over the protruding pins 120 to prevent damage to the vacuum bag 138.

A similar approach is shown in FIG. 2b wherein a perforated or apertured metal strip 140 is substituted for the protruding pins 120. The peripheral portion 130 of the upper composite skin 126 is laid over the apertured metal strip 140 such that under compacting pressure the apertures 142 thereof capture or grip the peripheral portion 130 to prevent lateral displacement of the upper composite skin 126. This approach yields similar results to the above-described pinned configuration, however, laborious cleaning is required to remove excess resin from the apertures 142 prior to initiating the next cure cycle.

A need therefore exists to provide an improved method of manufacturing HC composite articles which provides accurate and distortion-free core location and minimizes repair and/or maintenance of the molding assembly.

DISCLOSURE OF INVENTION

It is an object of the present invention to provide a method for manufacturing HC composite articles wherein the honeycomb core thereof is accurately located and substantially distortion-free.

It is another object of the present invention to provide a method for manufacturing HC composite articles wherein modifications to and maintenance of the molding assembly are minimized.

A HC composite article is fabricated by the steps of: forming a honeycomb core having a core edge, forming a precured composite skin having a restraint edge, placing the precured composite skin in combination with a rigid mold member defining a mold surface, mating the honeycomb core to the precured composite skin to form a mated subassembly wherein the restraint edge extends beyond the core edge, laying-up an uncured composite skin over the mated subassembly so that a peripheral portion of the uncured composite skin extends beyond the restraint edge by a distance X, and so that the peripheral portion is in superposed abutting engagement with the mold surface and wherein the honeycomb core, precured composite skin and uncured composite skin define a composite lay-up, disposing a vacuum bag over the composite lay-up to form a mold cavity between the mold surface and the vacuum bag, evacuating the mold cavity for urging the vacuum bag against the uncured composite skin and for compacting the same against the mated subassembly, the vacuum bag effecting engagement of the peripheral portion with the restraint edge and the mold surface for preventing lateral displacement of the uncured composite skin, and curing the uncured composite skin to form the HC composite article.

The foregoing and other objects, features and advantages of the present invention will become more apparent in light of the following detailed description of exemplary embodiments thereof, as illustrated in the accompanying drawings.

BRIEF DESCRIPTION OF THE DRAWINGS

A more complete understanding of the present invention and the attendant features and advantages thereof may be had by reference to the following detailed description of the invention when considered in conjunction with the following drawings wherein.

BEST MODE FOR CARRYING OUT THE INVENTION

Figure 1A:
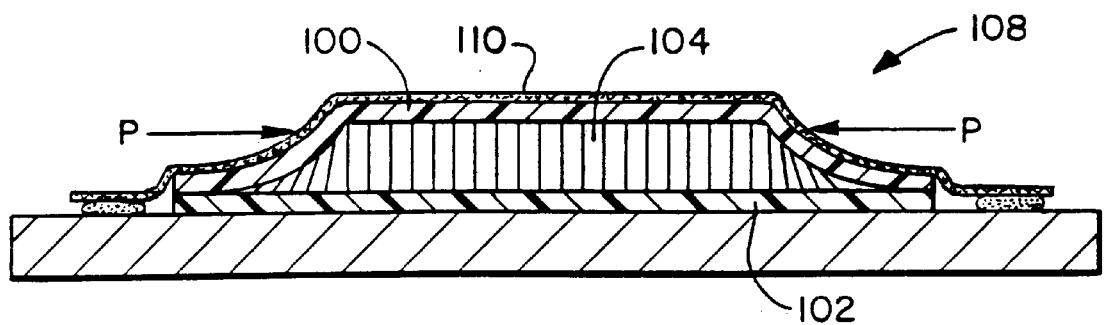
FIGS. 1a and 1b depict a honeycomb core (HC) composite article being formed in a vacuum bag molding assembly and the resultant distortion of the honeycomb core under molding assembly pressure.
Figure 1B:
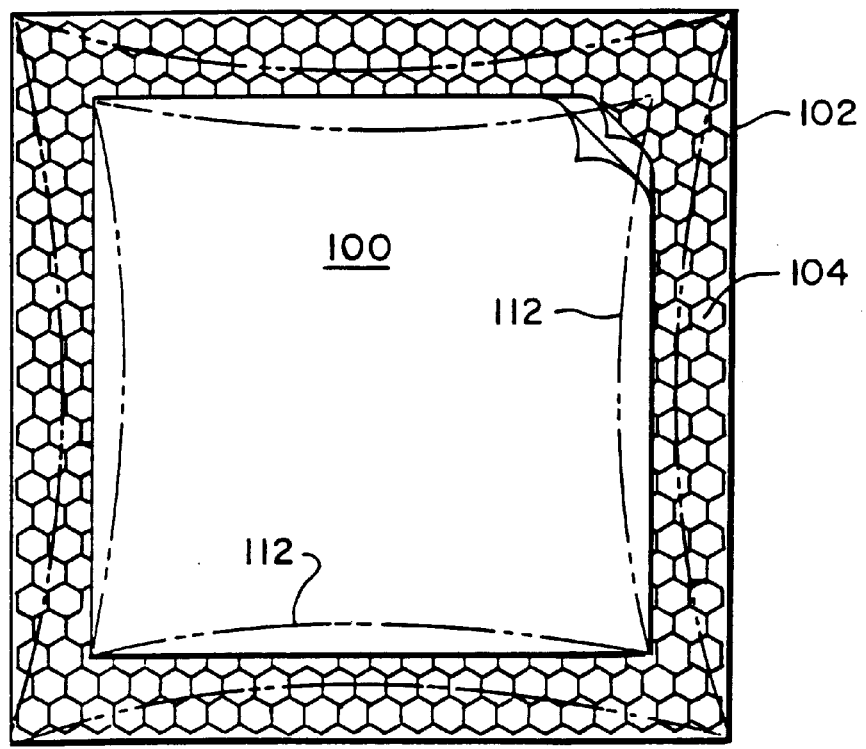
Figure 2A:
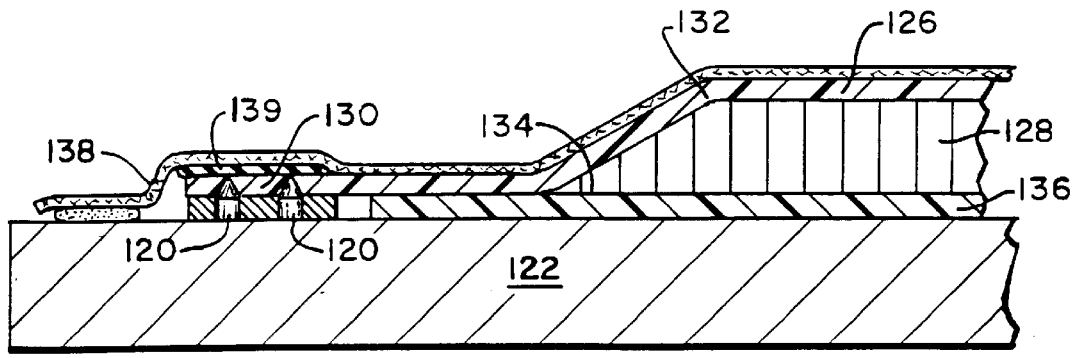
FIGS. 2a and 2b depict prior art molding apparatus for preventing distortion of a vacuum-formed HC composite article.
Figure 2B:
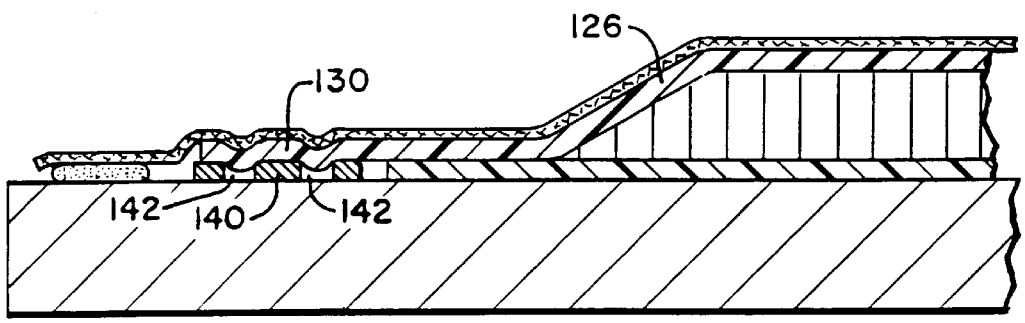
Figure 3:
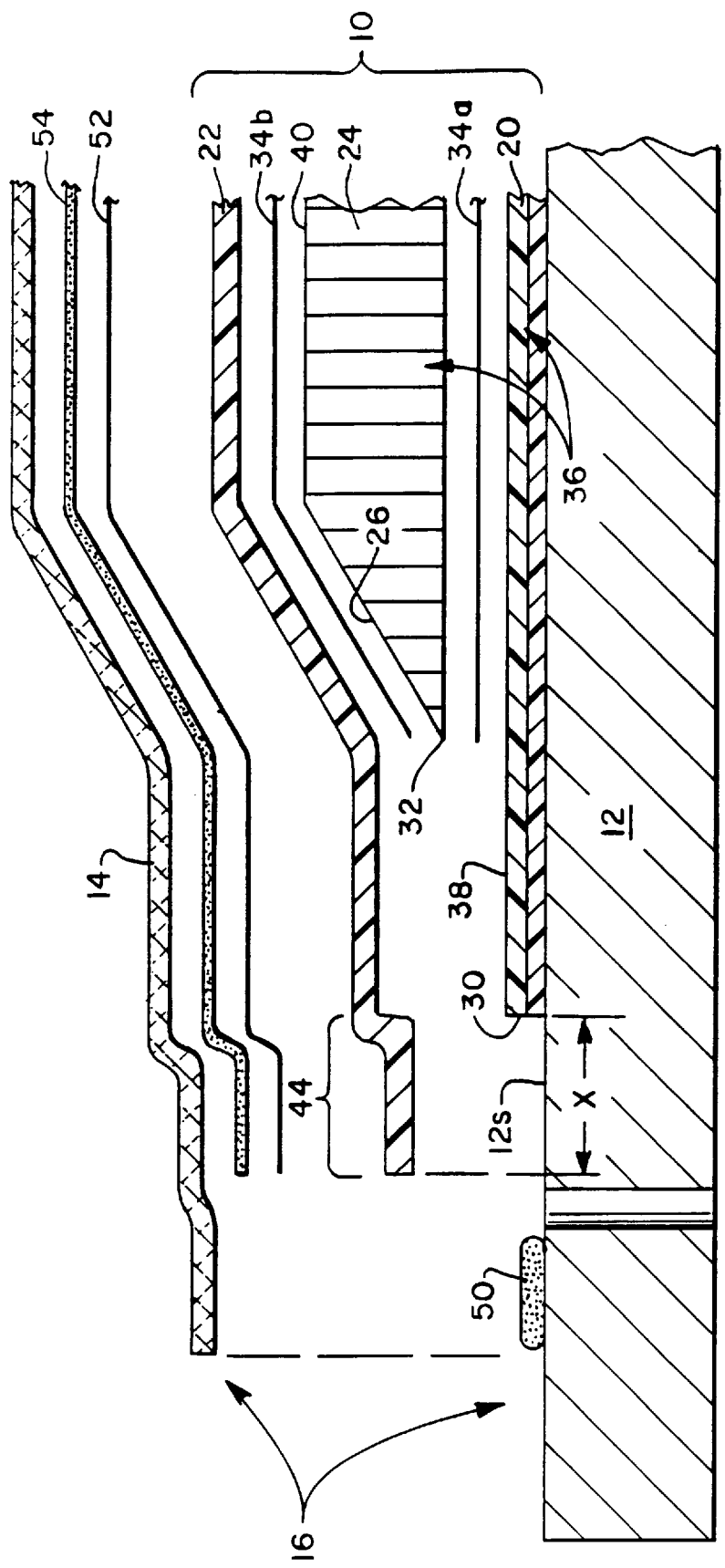
FIG. 3 depicts an exploded partial cross-sectional view of a HC composite lay-up employing the teachings of the present invention.

Referring now to the drawings wherein like reference characters identify corresponding or similar elements throughout the several views, FIG. 3 depicts an exploded partial cross-sectional view of a honeycomb core (HO) composite lay-up 10 disposed between a rigid mold member 12 and a vacuum bag 14 which, in combination, form a vacuum bag mold assembly 16. The composite lay-up 10 includes precured and uncured composite skins 20, 22, and a honeycomb core 24 disposed therebetween.

The honeycomb core 24 may be any of the conventionally used open cellular honeycombs such as aluminum, phenolic or NOMEX® (NOMEX is a registered trademark of Hexcel Corp., Chatsworth, Calif. for an aramid fiber or fabric). For applications wherein weight is a critical design criterion, a lightweight honeycomb core having a density of about 28.84 $Kg/m^3$ (1.8 $lbs/ft^3$) is preferred. Generally, honeycomb core is purchased in bulk and machined to the desired shape and size using Numerically Controlled (NC) machining apparatus. While the honeycomb core 24 is shown to have a ramped surface 26 to gradually transfer shear loads to the precured and uncured composite skins 20, 22, it will be understood that the teachings of the present invention are equally applicable to honeycomb cores having right-angled surfaces.

The precured composite skin 20 is comprised of fiber reinforced resin matrix composite laminates having a fiber reinforcement such as graphite, aramide or fiberglass fibers disposed in a binding matrix such as epoxy, phenolic or other similar organic resinous material. Preferably, two composite laminates having a total thickness of at least about 0.038 cm (0.015 in) are laid-up in a mold assembly and cured to form a cured composite panel. Any conventional fabrication method, such as vacuum forming, resin transfer molding, or matched metal molding may be used to form and cure the composite panel. The preferred method, however, utilizes a vacuum bag mold assembly wherein the same rigid mold member 12 employed for forming the HC composite lay-up is used for forming the precured composite skin 20. Once cured, at least one end of the cured composite panel is trimmed, thus forming the precured composite skin 20. The trimming operation also produces a restraint edge 30 having a right-angled configuration 30'. The utility of this construction will become evident when discussing the subsequent processing steps.

Figure 4:
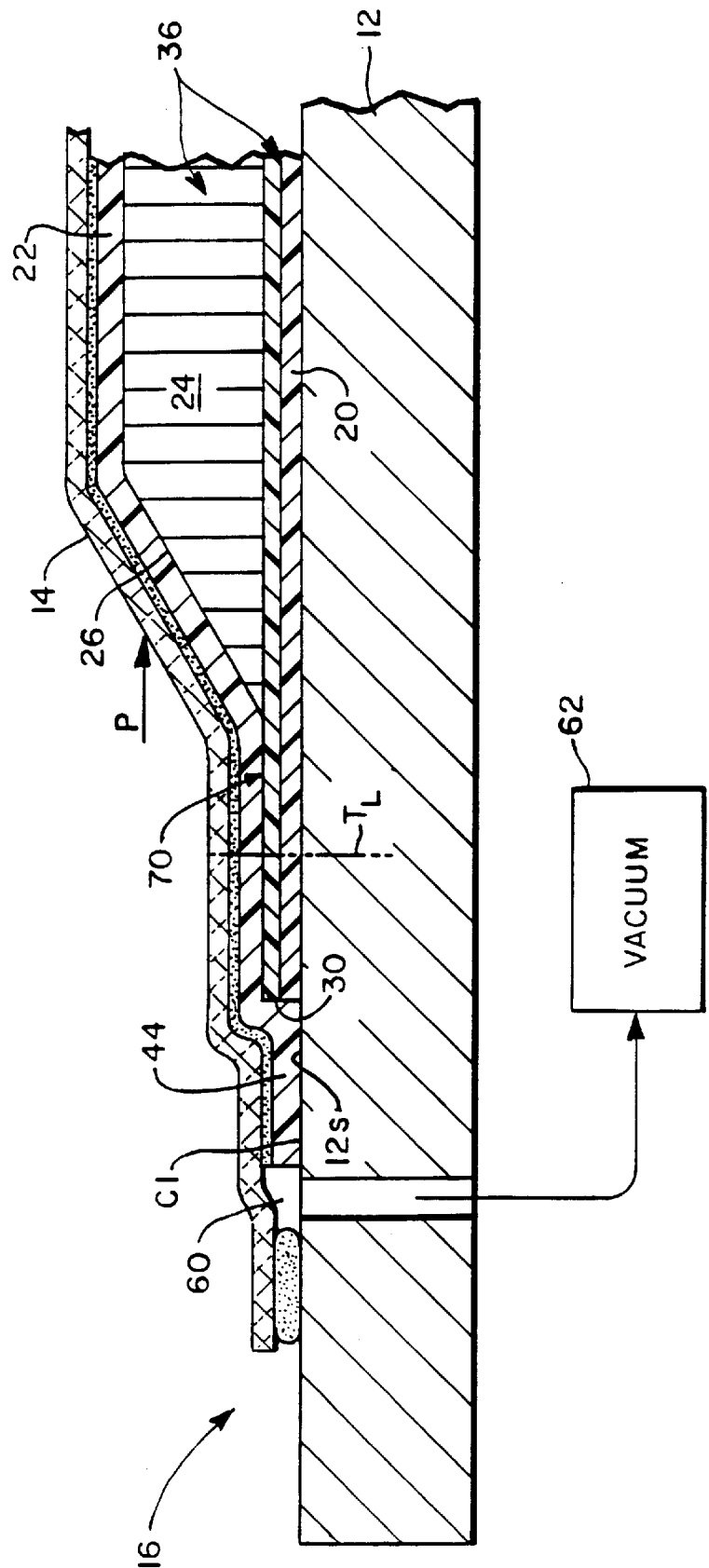
FIG. 4 depicts the HC composite article manufactured by the method of the present invention, and more particularly, the consolidation of the lay-up by a vacuum bag molding assembly.

The precured composite skin 20 is then returned to the rigid mold member 12 and the honeycomb core 24 is mated therewith to form a mated subassembly 36 (see FIG. 4). Furthermore, the honeycomb core 24 is disposed in superposed relation with the precured composite skin 20 so that restraint edge 30 extends beyond the edge 32 of the honeycomb core 24. That portion of the precured composite skin 20 extending beyond the core edge 32 also defines a mating surface 38. The mating step additionally includes the application of a bonding adhesive 34a to one or both of the mating surfaces, i.e., to either the honeycomb core 24 or the precured composite skin 20, for bonding the core to the precured composite skin 20. In the preferred embodiment, the bonding adhesive 34a is co-cured with the completed composite lay-up 10, i.e., concurrent with the curing step (cure cycle) described hereinbelow. However, it is also contemplated that the bonding operation may be performed prior to subsequent processing steps, e.g., as a independent operation requiring a unique cure cycle. The preferred bonding adhesive 34a is a film adhesive such as EA 9690 manufactured by Hysol Corp located in Pittsburgh, Calif.

The uncured composite skin 22 is comprised of one or more laminates of uncured preimpregnated fiber reinforced composite material having a fiber reinforcement such as graphite, aramide or fiberglass fibers disposed in a binding matrix such as epoxy, phenolic or other similar organic resinous material. In the preferred embodiment, a bonding adhesive 34b, such as Hysol 9690 film adhesive, is first applied to the exposed upper surface 40 of the honeycomb core 24 in preparation for the lay-up of the uncured composite skin 22. The adhesive 34b facilitates the bonding of the uncured composite skin 22 to the honeycomb core 24, however, it will be appreciated that the uncured binding matrix, i.e., resin of the uncured composite skin 22, may adequately wet the honeycomb core surface during the cure cycle to effect a suitable bond, thereby eliminating the need for the bonding adhesive 34b.

The uncured composite skin 22 is laid over the mated subassembly 36 and is precompacted using conventional debulking techniques to ensure intimate contact with the exposed upper honeycomb core surface 40 and the mating surface 38 of the precured composite skin 20. Furthermore, the uncured composite skin 22 is appropriately sized so as to permit a peripheral portion 44 thereof to extend beyond the restraint edge 30 of the precured composite skin 20. Moreover, the peripheral portion 44 is in superposed abutting engagement with the mold surface 12s of the rigid mold member 12 and extends a distance X beyond the restraint edge 30. Preferably, the peripheral portion 44 extends at least 1.9 cm (0.75 in) beyond the edge 30 and, more preferably, about 2.5 cm (1 in) beyond the edge 30.

The vacuum bag 14 is disposed over the completed composite lay-up 10 and sealed to the rigid mold member 12, or to itself, utilizing a conventional sealer strip 50 such as "Prestite" (Prestite is a brand name of a semi-adhesive compliant material produced by 3M located in St. Paul, Minn.). Optionally, a separator or release film 52 and a breather ply 54 may be interposed between the uncured composite skin 22 and the vacuum bag 14. The separator film 52 facilitates release of the vacuum bag 14 after curing the composite lay-up 10 while the breather ply 54 facilitates the removal of air and volitales from the uncured composite skin 22 during the cure cycle. Representative materials are specified in the below-described example. In the described embodiment, the use of the release film 52 and breather ply 54 are preferred, however, the composite lay-up 10 is minimally comprised of the honeycomb core 24, the precured composite skin 20, and the uncured composite skin 22.

The completed vacuum bag molding assembly 16 shown in FIG. 4 forms a sealed mold cavity 60, i.e., between the rigid mold member 12 and the vacuum bag 14, which is in fluid communication with a vacuum pump 62. The vacuum pump 62 functions to evacuate the mold cavity 60 of gaseous fluids, i.e., air and volitales, and to create a pressure differential for urging the vacuum bag 14 against the uncured composite skin 22. Concomitantly, the peripheral portion 44 of the uncured composite skin 22 is forced into engagement with the restraint edge 30 of the precured composite skin 20 and against the mold surface 12s.

The vacuum bag molding assembly 16 is then placed in an autoclave oven (not shown) wherein the composite lay-up 10 is exposed to additional pressure and temperature for curing. For the described embodiment, the autoclave oven applies a pressure of about $3.72 \times 10^7 - 4.46 \times 10^7 N/m^2$ (25–30 lbs/in$^2$) to the lay-up and elevates the temperature thereof to about 121–232° C. (250–450° F.) degrees for a period of about 120–180 mins.

During the vacuum forming step, i.e., evacuation of the mold cavity 60, and subsequent curing step, the peripheral portion 44 of the uncured composite skin 22 engages the restraint edge 30 of the precured composite skin 20 so as to provide a mechanical interlock therebetween. The restraint edge 30 functions to inhibit the lateral displacement of the uncured composite skin 22 and, consequently, cause a bridging effect therein in the region overlaying the ramped honeycomb surface 26. As discussed supra, the bridging effect functions to react the lateral component of pressure P applied by the vacuum bag 14. Concomitantly, the contacting interface Cl between the peripheral portion 44 and the mold surface 12s, provides additional restraint toward the objective of inhibiting lateral displacement. That is, the frictional force along the contacting interface Cl augments the restraint capacity of the restraint edge 30. Accordingly, by inhibiting lateral displacement and, consequently, the catenary displacement of the uncured composite skin 22, shifting and/or distortion of the honeycomb core 24 is minimized.

While the completed HC composite article may be used in the configuration produced by the foregoing process steps, the cured composite lay-up may be trimmed along line $T_L$ to net dimension to form a honeycomb core composite article having a uniform thickness peripheral flange 70. Preferably, the restraint edge 30 and the peripheral portion 44 are removed during this operation. Accordingly, the trimming operation removes the abrupt contour transition produced by the restraint edge 30 which enhances the strength of peripheral flange 70 for subsequent fastening and/or bonding operations.

The restraint edge 30 and the mold surface 12s are tooling surfaces which are functionally equivalent to the prior art pinned and perforated metal strip configurations, however, it will be appreciated that the formation of these tooling surfaces is far less labor intensive. The restraint edge 30 is formed in conjunction with the manufacturing process and becomes and integral part of the finished HC composite article. Furthermore, the only additional step involves the formation of the precured composite skin 20. Insofar as it is advantageous to precure a composite laminate for the purposes of improving laminate quality and strength, the method of the present invention will have no adverse cost effect on the manufacturing process when such improved quality and strength are desired. For example, the precured composite skin 20 may be formed under a pressure of $1.11 \times 10^8 N/m^2$ (75 lbs/in$^2$) to improve the fiber volume content, i.e., increase the fiber to resin ratio, and, consequently, the strength of the composite laminate. Such increased fiber volume is not achievable using conventional co-cure methods, i.e., wherein both composite skins are uncured before entering the autoclave oven, insofar as high compaction pressures cannot be transferred via the low density honeycomb core.

With regard to fabricating the rigid mold member 12 to include the mold surface 12s, which is slightly enlarged for superpositioning of the peripheral portion 44, it will be appreciated that fabricating such an additional area surface is inconsequential in terms of time and labor.

It will also be appreciated that the hazards and periodic maintenance of the prior art tooling surfaces are entirely eliminated by the method of the present invention. That is, the present method does not introduce hazardous tooling surfaces, e.g., pins, or other tooling surfaces, e.g., apertures which require periodic cleaning.

EXAMPLE

A honeycomb core (HC) composite article was fabricated using the teachings of the invention as follows. A sheet of 1.8 lbs/ft$^3$ NOMEX ® honeycomb core was machined to a thickness dimension of 3.0 cm (1.18 in), and a length and width dimension of 60.1 cm (24 in), respectively. The edges of the honeycomb core were beveled to form a 30° ramp angle about the entire periphery. The honeycomb core was then cleaned with alcohol and dried in an oven at 65.5° C. (150° F.) for a period of 120 minutes.

A first composite skin was formed by cutting two plies of KEVLAR® fiber reinforced composite material (KEVLAR® is a registered trademark of E. I. du Pont de Nemours & Co. located in Wilmington, Del. for an aromatic polyamide of high tensile strength) to a length and width dimension of 66.04 cm (26 in), respectively. The plies were sequentially laid in a rigid mold member of a vacuum bag molding assembly. A Fluorinated Ethylene-Propylene (FEP) separator film and a breather ply formed from a compliant porous material such as N-10 (the FEP film and N-10 ply were obtained from Airtech International located in Carson, Calif.) were respectively applied to the lay-up. A vacuum bag was applied to the lay-up and sealed to the rigid mold member using Prestite adhesive. The completed vacuum bag molding assembly was then placed in an autoclave oven to cure the plies. In the autoclave oven, the composite plies were step-cured for a period of 180 mins to a peak pressure and temperature of $1.11 \times 10^8 N/m^2$ (75 lbs/in$^2$) and 182.2° C. (360° F.), respectively. The lay-up resulted in a cured composite panel having a thickness dimension of 0.038 cm (0.015 in). The cured composite panel was then trimmed about its periphery to form a precured composite skin having a restraint edge. The net size of the precured composite skin was approximately 63.5 cm (25 in) square.

The precured composite skin was returned to the rigid mold member and a first layer of Hysol 9690 film adhesive was applied to the entire exposed surface. The prior-formed honeycomb core was then mated upon and centered over the precured composite skin so that the restraint edge extended approximately 2.54 cm (1 in) beyond the edge of the honeycomb core. A second layer of Hysol 9689 film adhesive was then applied to the exposed upper surface of the honeycomb core.

An uncured composite skin comprising two plies of KEVLAR® material was laid over the mated subassembly, i.e., the honeycomb core and the precured composite skin, so that a peripheral portion of the uncured composite skin extended 2.54 cm (1 in) beyond the restraint edge of the precured composite skin. The uncured composite skin was debulked using conventional vacuum debulking apparatus for 5 minutes. An FEP separator film and an N-10 breather ply were sequentially laid over the uncured composite skin. A vacuum bag was then placed over the uncured composite skin and sealed to the rigid mold member, thereby forming a completed vacuum bag molding assembly. The mold cavity was evacuated so as to apply atmospheric pressure (full vacuum) via the vacuum bag to the underlying composite lay-up. The peripheral portion of the uncured composite skin was thereby simultaneously forced into engagement with the restraint edge of the precured composite skin and the mold surface of the rigid mold member, respectively.

The vacuum bag molding assembly was then placing in an autoclave oven and step-cured as follows. The autoclave pressure was raised to $1.49 \times 10^7 N/m^2$ (10 lbs/in$^2$) and autoclave temperature was elevated to 93.3° C. (200° F.) for a first hold phase of 60 minutes. Approximately 30 minutes into the first hold phase, the autoclave pressure was gradually increased to $3.72 \times 10^7 N/m^2$ (25 lbs/in$^2$). Following the first hold phase, the temperature was gradually raised to 182.2° C. (360° F.) and held at a second hold phase (final cure phase) for 120 minutes.

The honeycomb core of the resultant composite article was found to be substantially distortion-free and accurately located relative to the composite skins.

The above described method may be used alone or in combination with various core stabilization techniques such as those described in U.S. Pat. Nos. 4,680,216 and 5,354,195. Furthermore, debulking operations may be performed between each of the above described lay-up steps to improve the efficacy of the resultant bonds.

Although the invention has been shown and described with respect to exemplary embodiments thereof, it should be understood by those skilled in the art that the foregoing and other changes, omissions and additions may be made therein and thereto, without departing from the spirit and scope of the present invention.

What is claimed is:

1. A method for making a honeycomb core composite article comprising the steps of:

forming a honeycomb core (24) having a core edge (32);

forming a precured composite skin (20) having a restraint edge (30);

placing said precured composite skin (20) in combination with a rigid mold member (12) having a mold surface (12s);

mating said honeycomb core (24) to said precured composite skin (20) thereby forming a mated subassembly (36) wherein said restraint edge (30) extends beyond said core edge (32);

laying-up an uncured composite skin (22) over said mated subassembly (36) so that a peripheral portion (44) of the uncured composite skin (22) extends beyond said restraint edge (30) by a distance X and, furthermore, so that said peripheral portion (44) is in superposed abutting engagement with said mold surface (12s), and wherein said honeycomb core (24), said precured composite skin (20) and said uncured composite skin (22) in combination define a composite lay-up (10);

disposing a vacuum bag (14) over said composite lay-up (10) thereby forming a mold cavity (60) between said mold surface (12s) and said vacuum bag (14);

evacuating said mold cavity (60) to urge said vacuum bag (14) against said uncured composite skin (22) for compacting the same against said mated subassembly (36), said vacuum bag (14) effecting engagement of said peripheral portion (44) with said restraint edge (30) and said mold surface (12s) for preventing lateral displacement of said uncured composite skin (22); and, curing said composite lay-up (10) to form the honeycomb core composite article.

2. The method according to claim 1 wherein said step of mating said honeycomb core (24) to said precured composite skin (20) includes the substep of applying a film adhesive (34a) between said honeycomb core (24) and said precured composite skin (20).

3. The method according to claim 2 further including the step of applying a bonding adhesive (34b) between said mated subassembly (36) and said uncured composite skin (22).

4. The method according to claim 1 wherein said uncured composite skin (22) is laid-up such that said distance X is greater than about 1.9 cm (0.75 in).

5. The method according to claim 1 further including the step of trimming the cured honeycomb core composite article so that said restraint edge (30) and said peripheral portion (44) are removed.

6. The method according to claim 1 wherein said step of forming said precured composite skin (20) includes forming said precured composite skin (20) so that the thickness thereof is greater than about 0.038 cm (0.015 in) and so that said restraint edge (30) defines a right angled configuration (30').

7. The method according to claim 1 wherein said step of forming said precured composite skin (20) includes vacuum forming a lay-up of composite laminates in said rigid mold member (12), and trimming said vacuum-formed lay-up to form said restraint edge (30) of said precured composite skin (20).

8. The method according to claim 1 further including the step of applying a release film (52) in combination with said uncured composite skin (20).

9. The method according to claim 8 further including the step of applying a breather ply (54) in combination with said release film (52).

10. A method for making a honeycomb core composite article comprising the steps of:

forming a honeycomb core (24) having a core edge (32);

forming a precured composite skin (20) having a restraint edge (30), said precured composite skin (20) being formed so that the thickness thereof is greater than about 0.038 cm (0.015 in);

placing said precured composite skin (20) in combination with a rigid mold member (12) having a mold surface (12s);

mating said honeycomb core (24) to said precured composite skin (20) thereby forming a mated subassembly (36) wherein said restraint edge (30) extends beyond said core edge (32);

laying-up an uncured composite skin (22) over said mated subassembly (36) so that a peripheral portion (44) of the uncured composite skin (22) extends beyond said restraint edge (30) by a distance greater than about 1.9 cm (0.75 in) and, furthermore, so that said peripheral portion (44) is in superposed abutting engagement with said mold surface (12s), and wherein said honeycomb core (24), said precured composite skin (20) and said uncured composite skin (22) in combination define a composite lay-up (10);

disposing a vacuum bay (14) over said composite lay-up (10) thereby forming a mold cavity (60) between said mold surface (12s) and said vacuum bag (14);

evacuating said mold cavity (60) to urge said vacuum bag (14) against said uncured composite skin (22) for compacting the same against said mated subassembly (36), said vacuum bag (14) effecting engagement of said peripheral portion (44) with said restraint edge (30) and said mold surface (12s) for preventing lateral displacement of said uncured composite skin (22);

curing said composite lay-up (10) to form the honeycomb core composite article; and, trimming said honeycomb core composite article so that said restraint edge (30) and said peripheral portion (44) are removed.

11. The method according to claim 10 wherein said step of forming said precured composite skin (20) includes the steps of vacuum forming a lay-up of composite laminates in said rigid mold member (12), and trimming said vacuum formed lay-up to form said restraint edge (30) of said precured composite skin (20).

12. The method according to claim 10 further including the step of applying a release film (52) in combination with said uncured composite skin (20).

13. The method according to claim 10 further including the step of applying a breather ply (54) in combination with said release film (52).

* * * * *